3,723,334
SCALE REDUCING AGENT IN ZINC PHOSPHATIZING COMPOSITIONS

James Irvin Maurer, St. Clair Shores, Mich., assignor to Oxy Metal Finishing Corporation, Warren, Mich.
No Drawing. Filed Oct. 26, 1971, Ser. No. 192,481
Int. Cl. C02b 1/00, 5/00
U.S. Cl. 252—181    9 Claims

ABSTRACT OF THE DISCLOSURE

A process for decreasing the scale formation in zinc phosphate composition comprising adding to the phosphatizing composition an effective scale reducing amount of a carbohydrate.

BACKGROUND OF THE INVENTION

One of the chronic problems of zinc phosphate processes is the build-up of scale on heating elements, headers, nozzles and the tank itself. Of particular concern is the build-up in the headers, and nozzles and on the heating elements. When this build-up persists, there is a decrease in the solution flow and often this results in changes in the spray patterns, making it difficult to obtain a satisfactory zinc coating. The build-up on the heating element causes insufficient heat exchange and problems in maintaining temperature. Both problems, therefore, result in expense by maintenance personnel to keep a metal coating line operating efficiently.

It is an object of the present invention to decrease the scale formation in zinc phosphate processing.

SUMMARY OF THE INVENTION

The invention is directed to a method for decreasing the scale formation in zinc phosphatizing compositions, used for producing a corrosion protective coating on various metals such as zinc, aluminum, steel, ferrous, etc. wherein the composition contains a scale reducing amount of a carbohydrate.

DESCRIPTION OF PREFERRED EMBODIMENTS

During the normal application of corrosion preventive coatings on to metallic surfaces such as zinc, aluminum, steel and ferrous, the application of these compositions results in build-up of a scale on the apparatus which comes in contact with the zinc phosphatizing composition. The methods that are followed in preparing the metallic surface are known in the art. See for example, U.S. Pat. 2,834,617, as well as U.S. 3,000,817. Normally, the metals to be treated are washed, rinsed and then the phosphatizing composition is applied normally in a spray or immersion type technique. The surfaces of the metal are being treated with the zinc phosphate composition are attacked by these compositions which results in a certain amount of base metal being dissolved. The base metal joins with the phosphate ions resulting in an undesirable scale formation.

In addition, the hydrolysis of zinc phosphate compositions will tend to form undesirable scale.

It has been found that when an effective scale reducing amount of a carbohydrate is added, a significant reduction in the scale formation has resulted.

For purposes of this invention, carbohydrates are termed those substances which are polyhydroxyaldehydes or polyhydroxyketones or substances which yield such compounds on hydrolysis (see text book of Organic Chemistry, Noller, 2nd edition, page 275). Accordingly, the carbohydrates that may be employed in the present invention are monosaccharides, that is carbohydrates that do not hydrolyze; oligosaccharides, that is carbohydrates that yield a few molecules of monosaccharides on hydrolysis, such as disaccharides, trisaccharides, or tetra, penta and hexasaccharides; and lastly polysaccharides, that is those carbohydrates that yield a large number of molecules of monosaccharides on hydrolysis, such as homosaccharides, and heteropolysaccharides. Generally the carbohydrate to be used is stable in the environment and is not detrimental to activity of the zinc phosphatizing composition.

Examples of monosaccharides are glucose and dextrose, mannose, and xylose.

Examples of oligosaccharides are maltose, cellobiose, and lactose.

Examples of homopolysaccharides are starch, amylose, amylopectin.

Examples of heterpolysaccharides are inulin, agar, and the like.

The most preferred carbohydrates that may be employed in the present invention are polysaccharides such as anionic heterpolysaccharides.

The most preferred carbohydrate is an anionic heteropolysaccharide produced by the fermentation of carbohydrate by the bacterium, Xanthomonas campestris and is available as Biopolymer XB–23 (trademark of General Mills). Biopolymer XB–23 is a light colored powder, 100% minus 50 mesh in size, is soluble in water but insoluble in alcohols.

Other preferred carbohydrates are dextrose, xylose, sucrose, alginic acid, pectin, agar and carbovymethylcellulose.

Examples of phosphatizing solutions in which the present application may be employed are as follows.

Phosphatizing Solution #1

| Ions: | Concentration range, g./l. |
|---|---|
| Calcium++ | 0–100 |
| Zinc++ | .1–50 |
| Nitrate⁻ | 0–250 |
| Phosphate⁻⁻⁻ | 1–100 |
| Sodium+ | 0–50 |
| Iron (Fe+2) | 0–10 |

The concentrations given above for the zinc phosphatizing compositions obviously will vary depending on the end use. For example, lighter coatings are used for paint bases than for surfaces which are used for corrosion resistance.

In addition to the above, various coating modifying ions may be used, such as, nitrite (0.005 to 0.1%), fluoride ion (0.01 to about 0.5%), chlorate (0.05–1%) and Ni++ (0.001–0.4%). All percentages are by weight.

When employing the carbohydrate of the present invention, it is preferred that an effective scale reducing amount be employed. Generally, this ranges from about 0.002 gram per liter to about 50 grams per liter. However, it should be pointed out that the upper limit may exceed the 50 grams per liter and is limited generally by the viscosity of the material and economics. The more material one adds to the bath the more costly and viscous the bath becomes.

Since some of the effective carbohydrates have thickening properties they are difficult to disperse in the phosphatizing solution. It is therefore useful to pre-wet them with a water miscible solvent. The water miscible solvent to be compatable with the phosphatizing solution. Polyethylene glycol with a molecular weight of 400 has been found to be particularly useful for this purpose.

It may be desirable to add other components to the phosphatizing composition to improve the activity of the scale reducing agent. Examples of these are anionic surface active agents. These agents are used in an amount ranging from about 0.001% to about 10% by weight.

Suitable anionic surfactants are sodium hydrocarbon sulfonates (of 8–10 carbon atoms), sodium alkylnaphthalene sulfonate, sodium alkyl aryl sulfonate, sodium alkyl diaryl sulfonate, sodium tetrahydronaphthalene sulfonate; all of the above are available as Alkanol products (trademark of Du Pont Company); other anionic surfactants that may be employed in the present invention are sodium and methyl-n-oleyl tauerate (Amaterg-trademark of American Aniline Products), sulfonated fatty acid ester (Amayct-trademark of American Aniline Products) as well as other linear alkyl sulfonates. A preferred class of surfactants are the linear alkyl sulfonates, such as those containing 8 to 20 carbon, such as sodium sulfate derivative of 2-ethyl-1-hexanol (Tergitol 08-trademark of Union Carbide Corporation).

Having described in general the embodiments of the invention, applicant hereby wishes to describe more preferred embodiments. All temperatures are degrees F. and parts are parts by weight, unless otherwise indicated.

EXAMPLE 1

This is an example of a calcium modified, zinc phosphate coating solution employed in a production tank. A typical analysis is given below. Total Acid 20.6 (10 ml. sample vs. 0.1 N NaOH, phenolphthalein)

| | |
|---|---|
| $Zn^{++}$ | 0.19 wt./volume. |
| $Ca^{++}$ | 0.34%. |
| $Fe^{+2}$ | 0.05%. |
| $PO_4^{---}$ | 1.02%. |
| $NO_3^-$ | 4.14%. |
| $Na^+$ | (1). |

[1] Enough to give a free acid 2.0 (10 ml. sample vs. 0.1 NaOH, bromphenol blue.

A bath having the above analysis was operated with and without the addition of 0.005% Biopolymer XB 23, 0.005% Tergitol 08, and 0.01% polyethylene glycol of molecular weight 400. Application by spray impingement at 155–165° F. for 40–60 seconds upon cold rolled steel ware was followed by an alkali cleaner and water rinse. Prior to the use of carbohydrate, the screens ahead of the pump intake scaled up and needed to be cleaned every 8 hour shift. After using the carbohydrate, cleaning was required about every two weeks. In addition, the scale build-up on the heating surface, pipes, nozzles and the housing of this unit was noticeably reduced.

EXAMPLE 2

The following is an example of a zinc phosphate coating solution used to treat automobile bodies manufactured out of cold rolled steel and hot dip galvanized steel. After alkali cleaning and water rinsing the bodies are treated by spraying a solution with the following nominal composition at 140–145° F. Total Acid 9.2 (10 ml. sample vs. 0.1 NaOH, phenolphthalein)

| | |
|---|---|
| $Zn^{++}$ | 0.14 |
| $PO_4^{---}$ | 0.56 |
| $F.^-$ | 0.02 |
| $Ni^{++}$ | 0.03 |
| $NO_3^-$ | 0.31 |
| $NO_2^-$ | 0.01 |
| $Na^+$ | (1) |
| Biopolymer XB 23 | 0.003 |
| Tergitol 08 | 0.003 |
| Polyethylene glycol of molecular weight 400 (PEG) | 0.005 |

[1] Quantity to give a free acid of 0.7 (10 ml. sample vs. 0.1 NaOH bromphenol blue).

The use of the carbohydrate resulted in a noticeable reduction in scale build-up, nozzle plugging and sludge obtained in a comparable bath operating without the carbohydrate.

EXAMPLE 3

In order to similate in a laboratory a commercial practice, a procedure was set up employing a phosphatizing solution as described below.

| | G./l. |
|---|---|
| $Ca^{++}$ | 4.9 |
| $Zn^{++}$ | 1.7 |
| $NO_3^-$ | 35.3 |
| $PO_4^{---}$ | 7.3 |
| $Na^+$ | 6.5 |

A 10 ml. sample of this solution when titrated with 0.1 N NaOH, using phenolphthalein indicator showed a total acid value of 16 points (mls. of 0.1 N NaOH to endpoint) and a free acid of 1.4 points (using bromphenol blue indicator).

In order to simulate an actual working bath, $$Fe(NO_3)_3 \cdot 9H_2O$$

solution is added. The final concentration is 0.5 g./l. of $Fe(NO_3)_3 \cdot 9H_2O$ in the phosphatizing solution. Normally the iron content of a working bath would come from the iron and steel articles being processed. The carbohydrates were pre dispersed or dissolved prior to adding to phosphatizing solution.

Two liters of the phosphatizing solution are poured into a two liter beaker which is heated by a Glas-Col 2 liter electric heating mantle. The mantle is operated without temperature regulators and at its maximum temperature. As the solution evaporates, the hot surfaces of the beaker simulate the surfaces on which scale forms in an industrial process.

The solutions are stirred with a slow speed stirring motors and paddles made from 1" x 4" pieces of 8 mesh stainless steel screen. This increases the rate of evaporation and prevents the solutions from boiling out of the beakers.

As the solutions are heating the material to be tested is added from previously prepared stock solutions. When the phosphatizing solutions reach boiling, one-half of the iron solution is added. The solutions are allowed to evaporate for one hour, after which the other half of the iron solution is added. The test is continued until approximately five inches of solution depth has been evaporated and only about two inches remains in the beaker. The solutions are allowed to cool without further stirring and the insides of the beaker are then rated for scale information.

A visual rating system has been developed. The greatest amount of scale, as formed by the solution without scale modifies, is given a rating of one. The least amount of scale, as formed by the Biopolymer XB 23 additive system, is given a rating of five. A rating of one would mean that the inside walls of the beaker, from the surface of the solution remaining after the test, upward for about four inches is covered with a deposit of white clinker-like scale about 3/16" thick.

Results of varying levels of Biopolymers XB 23 in the test solution.

| Grams per liter | | | |
|---|---|---|---|
| Tergitol 08 | Polyethylene glycol M.W. 400 | Biopolymer XB 23 | Rating of scale build-up |
| 0.034 | 0.07 | 0.45 | 5 |
| 0.034 | 0.07 | 0.034 | 5 |
| 0.034 | 0.07 | 0.017 | 5 |
| 0.034 | 0.07 | 0.904 | 4 |
| 0.034 | 0.07 | 0.002 | 3 |
| | | | 1 |

Therefore, approximately 0.002 g./l. represents the lower concentration limit.

EXAMPLE 4

Following the laboratory procedure of Example 3, various carbohydrates were tested at a concentration of 0.034 g./l. The results are indicated below.

| Carbohydrates: | Rating of scale build-up |
|---|---|
| Biopolymer XB 23 | 4 |
| Dextrose | 3–4 |
| Xylose | 3 |
| Sucrose | 2 |
| Alginic acid | 4–5 |
| Pectin | 3 |
| Agar | 3 |
| Carboxymethylcellulose (sodium salt)(CMC) | 3 |
| Blank | 1 |

In order to show the improvement that has been obtained when anionic surface active agents are employed and to demonstrate the inertness of the polyethylene glycols (M.W. 400) in the scale reducing system, the tests shown in Example 5 were conducted.

EXAMPLE 5

Following the laboratory procedure of Example 3, the following test results were obtained.

|   |   | Grams per liter | Rating of scale build-up |
|---|---|---|---|
| A | {Tergitol 08 / Biopolymer XB 23} | 0.034 / 0.034 | 5 |
| B | {Alkanol ND (sodium alkyl diaryl sulfonate) / Biopolymer XB 23} | 0.014 / 0.034 | 4+ |
| C | {Polyethylene glycol, M.W. 400 / Biopolymer XB 23} | 0.07 / 0.034 | 4 |
| D | Biopolymer XB 23 | 0.034 | 4 |

Polyethylene glycol and other water misible wetting aids are used to disperse the carbohydrates that form gels.

What is claimed is:

1. A process for decreasing the scale formation in a zinc phosphate composition comprising adding to a zinc phosphatizing composition an effective scale reducing amount of a carbohydrate.
2. The process of claim 1 wherein the carbohydrate is present in the composition in an amount ranging from about 0.002 to about 50 grams per liter.
3. The process of claim 1 wherein the carbohydrate is a monosaccharide.
4. The process of claim 1 wherein the carbohydrate is a disaccharide.
5. The process of claim 1 wherein the carbohydrate is a polysaccharide.
6. The process of claim 1 wherein the carbohydrate is a heteropolysaccharide.
7. The process of claim 1 wherein the composition further comprises an anionic surface active agent in an amount ranging from about .001% to about 10% by weight.
8. The process of claim 7 wherein the surface active agent is a linear alkyl sulfonate.
9. The process of claim 6 wherein the heteropolysaccharide is anionic.

References Cited
UNITED STATES PATENTS

| 3,524,749 | 8/1970 | Parker et al. | 106—14 |
| 3,347,797 | 10/1967 | Kvegemann et al. | 252—181 |
| 2,996,449 | 8/1961 | Hodge et al. | 210—58 |
| 2,678,303 | 5/1954 | Bonewitz et al. | 252—156 |

GEORGE F. LESMES, Primary Examiner

W. R. DIXON, JR., Assistant Examiner

U.S. Cl. X.R.

21—2.7; 106—14; 210—58; 252—389 A